(12) United States Patent
Hung et al.

(10) Patent No.: US 10,810,957 B2
(45) Date of Patent: Oct. 20, 2020

(54) DISPLAY DEVICE AND DISPLAY DEVICE DRIVING METHOD THEREOF

(71) Applicant: AU Optronics Corporation, Hsin-Chu (TW)

(72) Inventors: Chia-Che Hung, Hsin-Chu (TW); Mao-Hsun Cheng, Hsin-Chu (TW); Jian-Shen Yu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/263,008

(22) Filed: Jan. 31, 2019

(65) Prior Publication Data

US 2020/0090607 A1     Mar. 19, 2020

(30) Foreign Application Priority Data

Sep. 14, 2018   (TW) .............................. 107132517 A (51) Int. Cl.
G09G 3/36      (2006.01)
G02F 1/133     (2006.01)
G02F 1/1362    (2006.01)

(52) U.S. Cl.
CPC ....... *G09G 3/3648* (2013.01); *G02F 1/13306* (2013.01); *G02F 1/13624* (2013.01);
(Continued)

(58) Field of Classification Search
CPC ............... G09G 3/3611; G09G 3/3648; G09G 2300/0439; G09G 2300/0478;
(Continued)

(56) References Cited

U.S. PATENT DOCUMENTS 5,386,543 A * 1/1995 Bird .................... G06F 3/0412
                                                358/1.1
6,107,981 A * 8/2000 Fujita .................. G09G 3/3696
                                                345/95
(Continued)

FOREIGN PATENT DOCUMENTS

CN      101251783 A      8/2008
CN      101587271 A      11/2009
(Continued)

*Primary Examiner* — Jimmy H Nguyen
(74) *Attorney, Agent, or Firm* — WPAT, PC (57) ABSTRACT

A display device driving method, applicable to a display device including a pixel circuit coupled with a first node point, a source driving circuit for providing a data signal, and a reading circuit, including following operations: coupling the first node point with the source driving circuit or the reading circuit; supplying a first control signal to the pixel circuit, wherein the first control signal is for enabling the pixel circuit to receive the data signal from the first node point; supplying a second control signal to an optical sensing circuit, wherein the second control signal is for enabling the optical sensing circuit to output a sensing signal to the reading circuit through the first node point; utilizing the reading circuit to amplify the sensing signal and output the amplified sensing signal, wherein duration of the second impulse overlaps with duration of the first impulse.

10 Claims, 10 Drawing Sheets

(52) U.S. Cl.
CPC .. *G02F 1/136213* (2013.01); *G02F 1/136286* (2013.01); *G09G 3/3611* (2013.01)

(58) Field of Classification Search
CPC .......... G09G 2300/0809; G06F 3/0412; G06F 3/0416; G02F 1/13306; G02F 1/136213; G02F 1/136286; G02F 1/13624
See application file for complete search history.

(56) References Cited

U.S. PATENT DOCUMENTS

| | | | |
|---|---|---|---|
| 2008/0024414 A1* | 1/2008 | Shih | G06F 3/0416 345/92 |
| 2008/0198143 A1 | 8/2008 | Kinoshita | |
| 2009/0289919 A1 | 11/2009 | Jung | |
| 2010/0295833 A1* | 11/2010 | Nishio | G06F 3/0412 345/207 |

FOREIGN PATENT DOCUMENTS

| | | |
|---|---|---|
| CN | 101609220 A | 12/2009 |
| TW | 200813926 A | 3/2008 |

\* cited by examiner

DISPLAY DEVICE AND DISPLAY DEVICE DRIVING METHOD THEREOF

CROSS-REFERENCE TO RELATED APPLICATION

This application claims priority to Taiwan Application Serial Number 107132517, filed Sep. 14, 2018, which is herein incorporated by reference in its entirety.

BACKGROUND

Field of Invention

The present disclosure relates to a display device and a display device driving method thereof. More particularly, the present disclosure relates to a driving method applicable to a display device comprising an optical sensing circuit.

Description of Related Art

The liquid-crystal display (LCD) is the most popular display technology due to the advantages such as low cost, low power consumption, and structure that is thin and light. Nowadays, a demand for touch control or writing directly on the panel is increasing, and thus the LCDs with optical touch control function become more popular.

The conventional optical touch control LCDs have the pixel circuits and the optical sensing circuits that are manufactured on the same layer. For example, the circuit block of the pixel circuits and the circuit block of the optical sensing circuits are both realized by thin-film transistors. However, parasitic elements are coupled between the data line corresponding to the pixel circuits and the output path of the optical sensing circuits, and thus the data signal and the sensing signal of the optical sensing circuits disturb each other.

SUMMARY

The disclosure provides a display device driving method. The display device driving method is applicable to a display device. The display device comprises a pixel circuit, a source driving circuit, and a reading circuit. The pixel circuit is coupled with a first node point, and the source driving circuit is configured to provide a data signal. The display device driving method comprises the following operations: selectively coupling the first node point with the source driving circuit or the reading circuit; supplying a first control signal to the pixel circuit, wherein the first control signal provides a first impulse, and the first impulse is configured to enable the pixel circuit to receive the data signal from the first node point; supplying a second control signal to an optical sensing circuit, wherein the second control signal provides a second impulse, and the second impulse is configured to enable the optical sensing circuit to output a sensing signal to the reading circuit through the first node point; and utilizing the reading circuit to amplify the sensing signal and output the amplified sensing signal, wherein duration of the second impulse overlaps with duration of the first impulse.

The disclosure provides another display device driving method. The display device driving method is applicable to a display device. The display device includes a plurality of pixel circuits, a source driving circuit, and a reading circuit. The plurality of pixel circuits is coupled with a first node point, and the source driving circuit is configured to provide a data signal. The display device driving method includes the following operations: selectively coupling the first node point with the source driving circuit or the reading circuit; during a writing stage, supplying a plurality of first control signals to the plurality of pixel circuits, respectively, wherein the plurality of first control signals sequentially provide a first impulse so that the plurality of pixel circuits sequentially receive the data signal from the first node point; during a reading stage, supplying a plurality of second control signals to a plurality of optical sensing circuits, respectively, wherein the plurality of second control signals sequentially provide a second impulse so that the plurality of optical sensing circuits sequentially output a sensing signal to the first node point; and utilizing the reading circuit to amplify the plurality of sensing signals and output the amplified plurality of sensing signals, wherein duration of the plurality of first impulses are forbidden to overlap with duration of the plurality of second impulses.

The disclosure provides a display device including a plurality of pixel circuits, a plurality of optical sensing circuits, a source driving circuit, a reading circuit, a plurality of multiplexers, and a gate driving circuit. A pixel circuit of the plurality of pixel circuits is coupled with a first node point. An optical sensing circuit of the plurality of optical sensing circuits is coupled with the first node point. The reading circuit is coupled with the source driving circuit. A multiplexer of the plurality of multiplexers is coupled with the first node point, and the multiplexer is configured to selectively couple the first node point with the source driving circuit or the reading circuit. The gate driving circuit is configured to supply a first control signal and a second control signal. The first control signal provides a first impulse, and the first impulse is configured to enable the pixel circuit to receive the data signal from the first node point. The second control signal provides a second impulse, and the second impulse is configured to enable the optical sensing circuit to output a sensing signal to the reading circuit through the first node point. The reading circuit is configured to amplify the sensing signal and output the amplified sensing signal, and duration of the second impulse overlaps with duration of the first impulse.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
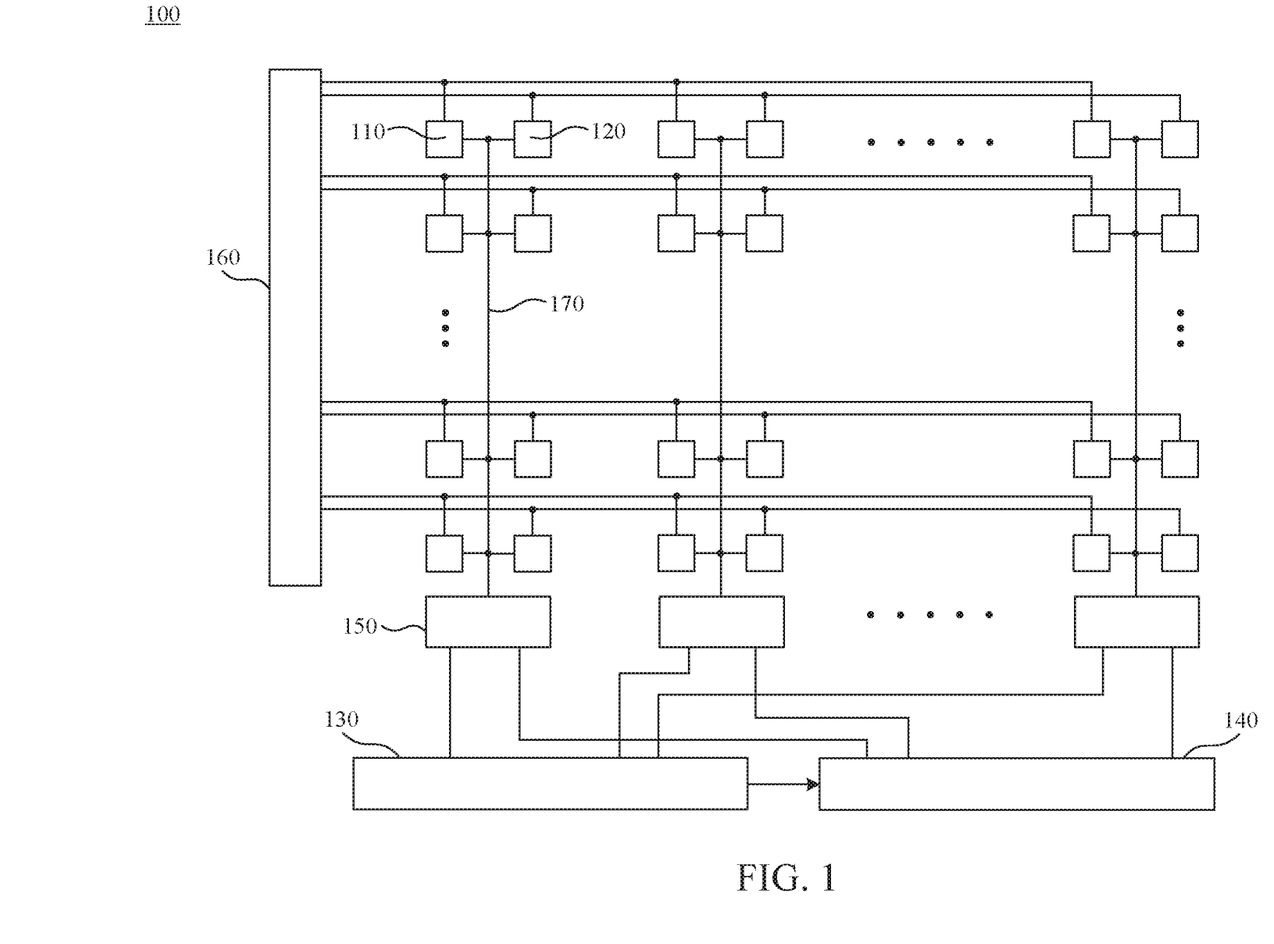
FIG. 1 is a simplified functional block diagram of a display device according to one embodiment of the present disclosure.

FIG. 1 is a simplified functional block diagram of a display device 100 according to one embodiment of the present disclosure. The display device 100 comprises multiple pixel circuits 110, multiple optical sensing circuits 120, a source driving circuit 130, a reading circuit 140, multiple multiplexers 150, and a gate driving circuit 160. The source driving circuit 130 and the reading circuit 140 are coupled with each other.

Each of the multiple multiplexers 150 is coupled with the source driving circuit 130, the reading circuit 140, and a data line 170, and is also coupled with a column of pixel circuits 110 and a column of optical sensing circuits 120 through the data line 170. The multiplexer 150 is configured to selectively couple the pixel circuits 110 and the optical sensing circuits 120, which are coupled with the multiplexer 150, with one of the source driving circuit 130 and the reading circuit 140. The gate driving circuit 160 is configured to drive the multiple pixel circuits 110 and the multiple optical sensing circuits 120 of the display device 100. For the sake of brevity, other functional blocks of the display device 100 are not shown in FIG. 1.

Figure 2:
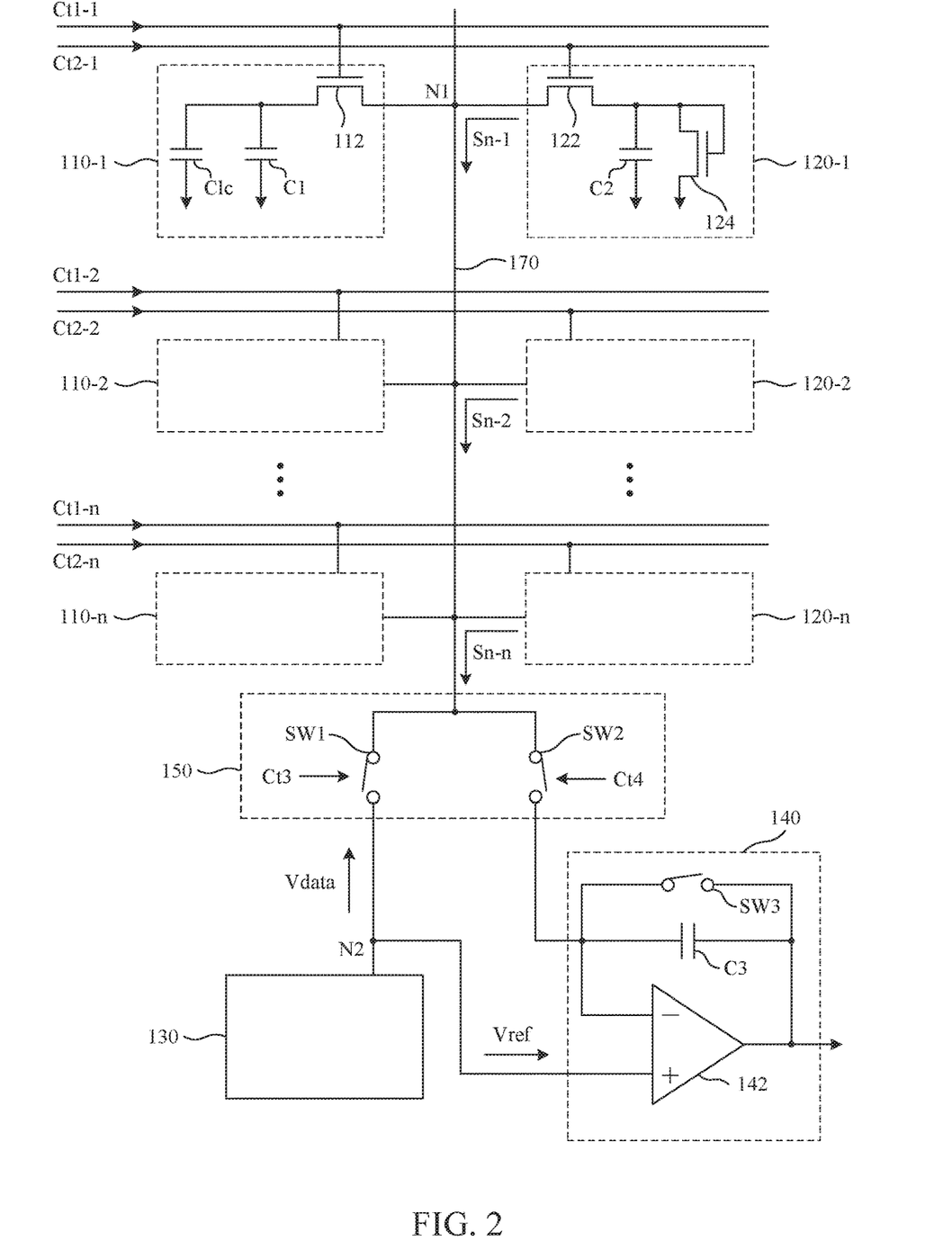
FIG. 2 is an enlarged schematic diagram of part of the display device of FIG. 1.

FIG. 2 is an enlarged schematic diagram of part of the display device 100 of FIG. 1. For the purpose of explanatory convenience in the following description, the column of pixel circuits 110 and the column of optical sensing circuits 120 coupled with the multiplexer 150 are hereinafter referred to as pixel circuits 110-1~110-$n$ and optical sensing circuits 120-1~120-$n$, respectively. As shown in FIG. 2, the data line 170 is coupled with the pixel circuits 110-1~110-$n$ and the optical sensing circuits 120-1~120-$n$. The display device 100 supplies first control signals Ct1-1~Ct1-$n$ to the pixel circuits 110-1~110-$n$, respectively, and also supplies second control signals Ct2-1~Ct2-$n$ to the optical sensing circuits 120-1~120-$n$, respectively.

Throughout the specification and drawings, indexes 1~n may be used in the reference labels of components and devices for ease of referring to respective components and devices. The use of indexes 1~n does not intend to restrict the amount of components and devices to any specific number. Because the pixel circuits 110-1~110-$n$ have the same configuration with respect to each other and the sensing circuits 120-1~120-$n$ also have the same configuration with respect to each other, for the sake of brevity, the pixel circuit 110-1 and the sensing circuit 120-1 will be described as examples.

Pixel circuit 110-1 comprises a first transistor 112, a first capacitor C1, and a liquid crystal capacitor Clc. The first transistor 112 comprises a first node, a second node, and a control node. The first node of the first transistor 112 is coupled with the first node point N1. The second node of the first transistor 112 is coupled with the first capacitor C1 and the liquid crystal capacitor Clc. The control node of the first transistor 112 is configured to receive the first control signal Ct1-1 from the gate driving circuit 160. That is, the first transistor 112 is coupled between the first node point N1 and the first capacitor C1 as well as the liquid crystal capacitor Clc, wherein the first node point N1 is located on the data line 170.

The optical sensing circuit 120-1 comprises a second transistor 122, a third transistor 124, and a second capacitor C2. The second transistor 122 comprises a first node, a second node, and a control node. The first node of the second transistor 122 is coupled with the first node point N1. The second node of the second transistor 122 is coupled with the second capacitor C2. The control node of the second transistor 122 is configured to receive the second control signal Ct2-1 from the gate driving circuit 160. The third transistor 124 comprises a first node, a second node, and a control node. The first node and control node of the third transistor 124 is coupled with the second node of the second transistor 122 and the second capacitor C2. The second node of the third transistor 124 is configured to receive a fixed voltage.

The multiplexer 150 is coupled with the first node point N1 and the reading circuit 140, and coupled with the source driving circuit 130 through the second node point N2. Specifically, the multiplexer 150 comprises a first switch SW1 and a second switch SW2. The first switch SW1 comprises a first node, a second node, and a control node. The first node of the first switch SW1 is coupled with the first node point N1. The second node of the first switch SW1 is coupled with the second node point N2. The control node of the first switch SW1 is configured to receive the third control signal Ct3. The second switch SW2 comprises a first node, a second node, and a control node. The first node of the second switch SW2 is coupled with the first node point N1. The second node of the second switch SW2 is coupled with the reading circuit 140. The control node of the second switch SW2 is configured to receive the fourth control signal Ct4.

The reading circuit 140 comprises an amplifier 142, a third capacitor C3, and a third switch SW3. The amplifier 142 comprises a first node, a second node, and an output node. The first node of the amplifier 142 (e.g., the inverting input node) is coupled with the second node of the second switch SW2. The second node of the amplifier 142 (e.g., the non-inverting input node) is coupled with the second node point N2. The third capacitor C3 and the third switch SW3 is coupled between the first node and output node of the amplifier 142 in a parallel connection.

In other words, the second node of the amplifier 142 is coupled with the source driving circuit 130 through the second node point N2.

The foregoing descriptions regarding the implementations and connections of the pixel circuit 110-1 are also applicable to the pixel circuits 110-2~110-$n$, and the foregoing descriptions regarding the implementations and connections of the optical sensing circuit 120-1 are also applicable to the optical sensing circuits 120-2~120-$n$. For the sake of brevity, those descriptions will not be repeated here.

Figure 3:
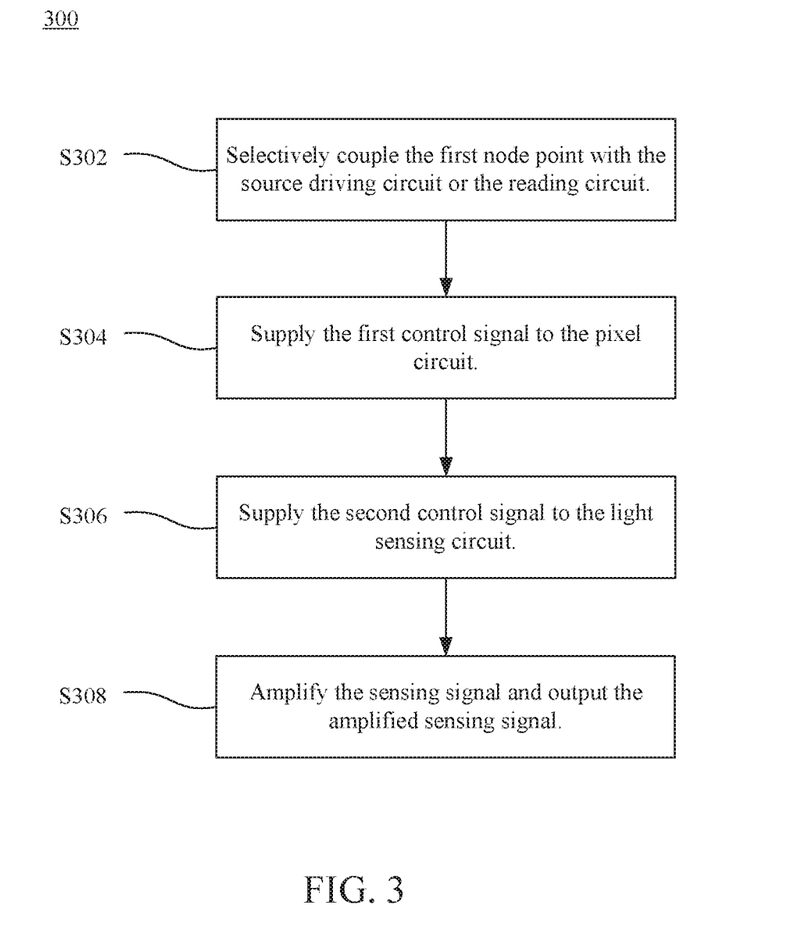
FIG. 3 is a simplified flowchart of a display device driving method according to one embodiment of the present disclosure.
Figure 4:
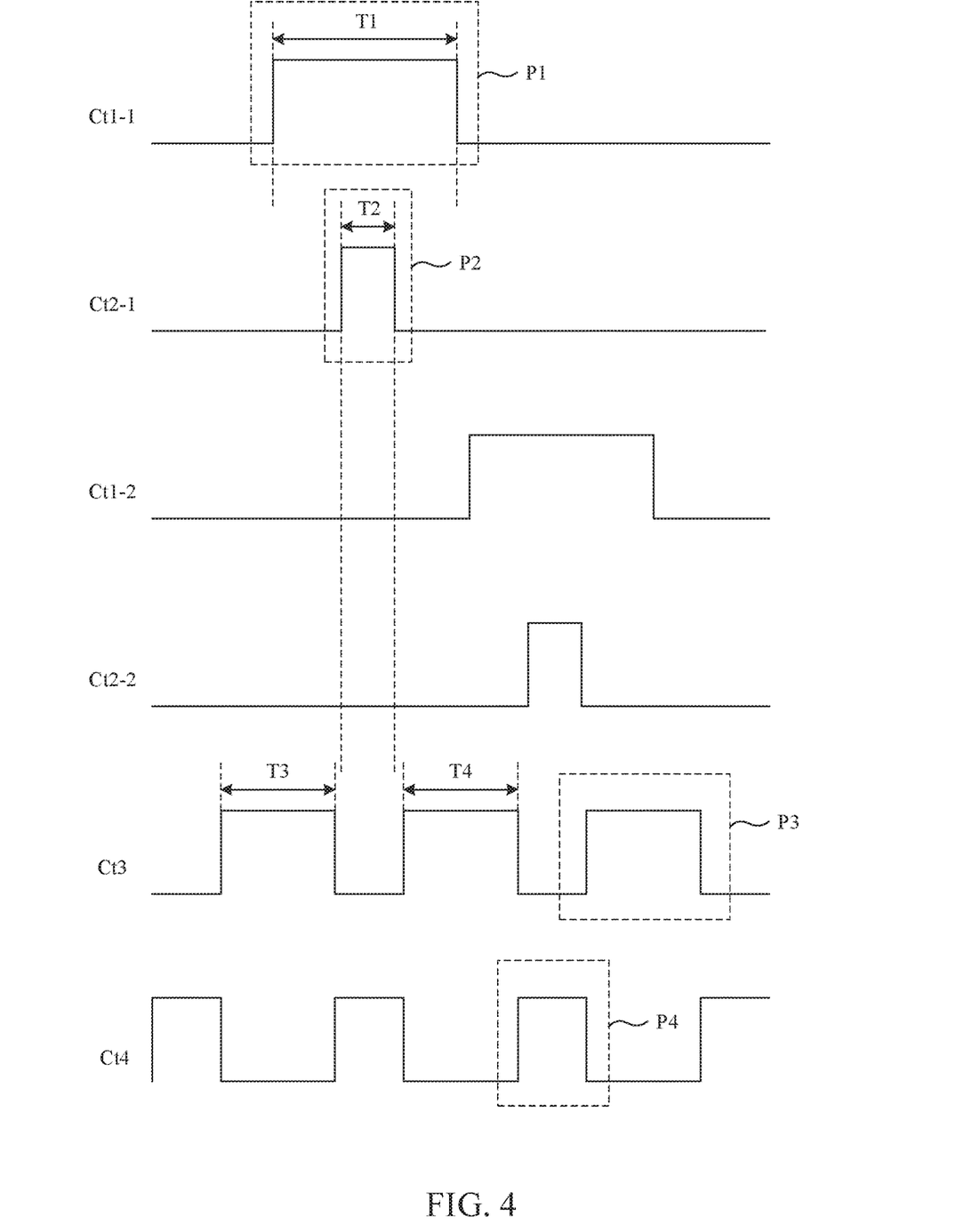
FIG. 4 is a timing diagram of the control signals of the display device according to one embodiment of the present disclosure.

FIG. 3 is a simplified flowchart of a display device driving method 300 according to one embodiment of the present disclosure. FIG. 4 is a timing diagram of the control signals of the display device 100 according to one embodiment of the present disclosure. The display device driving method 300 is applicable to the display device 100, and will be further described in the following by reference to FIGS. 2 through 4.

In operation S302, the multiplexer 150 intermittently conducts or switches off the first switch SW1 and the second switch SW2 according to the third control signal Ct3 and the fourth control signal Ct4, and status of the first switch SW1 is opposite to the status of the second switch SW2. That is, the third control signal Ct3 and the fourth control signal Ct4 are configured to control the switching operation of the multiplexer 150, so that the multiplexer 150 is capable of selectively coupling the first node point N1 with one of the source driving circuit 130 and the reading circuit 140. The detail operation of the multiplexer 150 will be further described in the following paragraphs.

Please refer to FIGS. 3 and 4, the display device 100 supplies the first control signal Ct1-1 to the pixel circuit 110-1 in operation S304. The first control signal Ct1-1 provides a first impulse P1 to the pixel circuit 110-1 during the first time period T1, so as to conduct the first transistor 112. Therefore, when the first switch SW1 is intermittently conducted, the pixel circuit 110-1 may receive the data signal Vdata from the source driving circuit 130 through the first node point N1 and the first switch SW1.

In operation S306, the display device 100 supplies a second control signal Ct2-1 to the optical sensing circuit 120-1. The second control signal Ct2-1 provides a second impulse P2 to the optical sensing circuit 120-1 during the second time period T2, so as to conduct the second transistor 122. Therefore, when the second switch SW2 is intermittently conducted, the optical sensing circuit 120-1 may output the sensing signal Sn-1 to the reading circuit 140 through the first node point N1 and the second switch SW2.

As shown in FIG. 4, the starting point of the second time period T2 is later than the starting point of the first time period T1, and the ending point of the second time period T2 is earlier than the ending point of the first time period T1. As a result, the duration of the second impulse P2 overlaps with the duration of the first impulse P1.

In operation S308, when the reading circuit 140 receives the sensing signal Sn-1, the reading circuit 140 amplifies the sensing signal Sn-1 and outputs the amplified sensing signal Sn-1.

Figure 5:
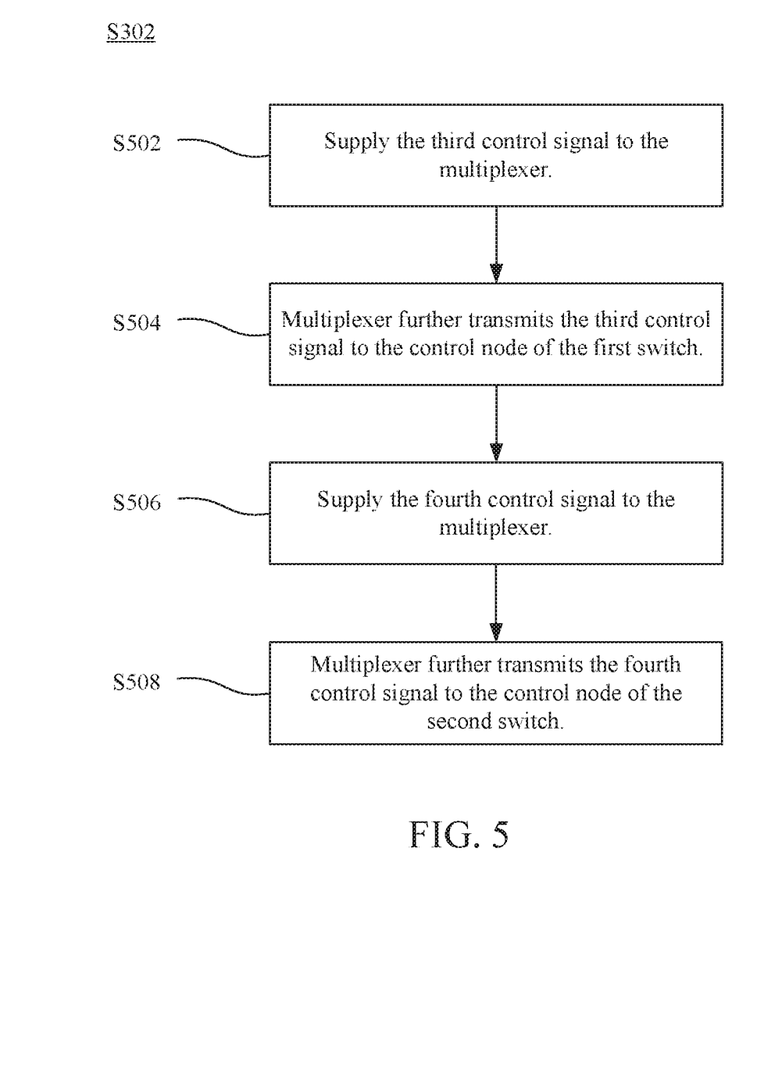
FIG. 5 is a flowchart for further illustrating the operation S302 according to one embodiment of the present disclosure.

FIG. 5 is a flowchart for further illustrating the operation S302 according to one embodiment of the present disclosure. As shown in FIG. 5, the operation S302 comprises operations S502~S508. In operation S502, the display device 100 supplies the third control signal Ct3 to the multiplexer 150. Then, in operation S504, the multiplexer 150 further transmits the third control signal Ct3 to the control node of the first switch SW1.

In operation S506, the display device 100 supplies the fourth control signal Ct4 to the multiplexer 150. Then, in operation S508, the multiplexer 150 further transmits the fourth control signal Ct4 to the control node of the second switch SW2.

As shown in FIG. 4, the third control signal Ct3 and the fourth control signal Ct4 are opposite to each other. The third control signal Ct3 comprises multiple third impulses P3, and the fourth control signal Ct4 comprises multiple fourth impulses P4. The multiple third impulses P3 and multiple fourth impulses P4 are configured to intermittently conduct the first switch SW1 and the second switch SW2. Specifically, the third impulse P3 is configured to conduct the first switch SW1, and the fourth impulse P4 is configured to conduct the second switch SW2.

The third control signal Ct3 provides a third impulse P3 during the third time period T3, and provides another third impulse P3 during the fourth time period T4. The two third impulses P3 corresponding to the third time period T3 and the fourth time period T4 are adjacent to each other. The starting point of the first time period T1 is earlier than the ending point of the third time period T3, and the ending point of the first time period T1 is earlier than the ending point of the fourth time period T4. Therefore, the duration of the first impulse P1 at least partially overlaps with the duration of the two third impulses P3 corresponding to the third time period T3 and the fourth time period T4.

In addition, the starting point of the second time period T2 is later than the ending point the of the third time period T3, and the ending point of the second time period T2 is earlier than the starting point of the fourth time period T4. Therefore, the duration of the second impulse P2 is forbidden to overlap with the duration of the two third impulses P3 corresponding to the third time period T3 and the fourth time period T4.

In other words, during the second time period T2, the first switch SW1 is switched off and the second switch SW2 is conducted, and the first transistor 112 and the second transistor 122 are both conducted.

The data line 170 has a charging time constant. The charging time constant represents a time period required to charge a voltage level of the data line 170 from 0 V to 63.2% of the voltage level of the data signal Vdata when utilizing the data signal Vdata to charge the data line 170.

In this embodiment, the duration of the aforesaid first impulse P1 (e.g., the first time period T1) is at least three times as long as the charging time constant of the data line 170. As a result, even though the first switch SW1 is temporarily switched off during the second time period T2, the display device 100 ensures that the liquid crystal capacitor Clc is charged to a voltage level equal to the voltage level of the data signal Vdata at the ending point of the first time period T1.

Figure 6:
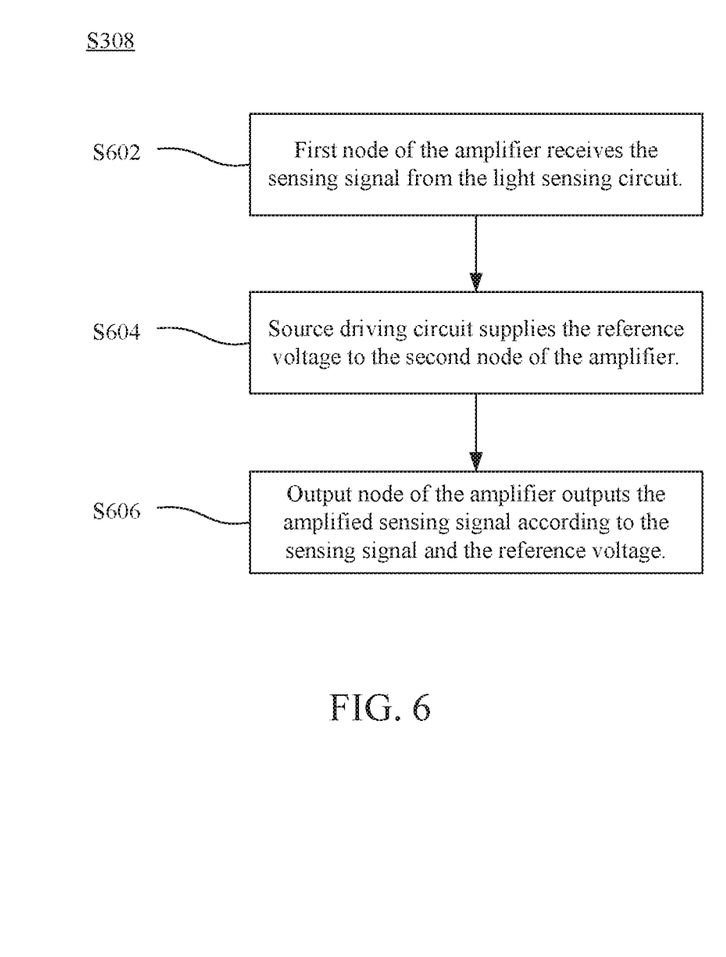
FIG. 6 is a flowchart for further illustrating the operation S308 according to one embodiment of the present disclosure.

FIG. 6 is a flowchart for further illustrating the operation S308 according to one embodiment of the present disclosure. As shown in FIG. 6, the operation S308 comprises operations S602~S606. The display device 100 conducts the operations S602~S606 during the second time period T2. That is, in operations S602~S606, the first switch SW1 is switched off and the second switch SW2 is conducted.

In operation S602, the first node of the amplifier 142 (e.g., the inverting input node) receives the sensing signal Sn-1 from the optical sensing circuit 120-1. In operation S604, the source driving circuit 130 supplies the reference voltage Vref to the second node of the amplifier 142 (e.g., the non-inverting input node). In operation S606, the third switch SW3 is at the switched-off status so that the output node of the amplifier 142 outputs the amplified sensing signal Sn-1 according to the sensing signal Sn-1 and the reference voltage Vref.

It is worth mentioning that since the first node and the second node of the amplifier 142 are virtually shorted, the voltages of the first node and the second node of the amplifier 142 are similar to each other. In this embodiment, the reference voltage Vref supplied by the source driving circuit 130 has a voltage level similar to that of the data signal Vdata. Therefore, when the display device 100 conducts the operations S602~S606, the voltage level of the data line 170 will not vary tremendously, so as to protect the components coupled with the data line 170 and keep the liquid crystal capacitor Clc having the voltage level similar to that of the data signal Vdata.

When the display device 100 finishes the display device driving method 300 by following the aforesaid sequence, the display device 100 may again conduct the display device driving method 300. As a result, the display device 100 can use similar operations to control the first control signal Ct1-2 and the second control signal Ct2-2 to provide the first impulse P1 and the second impulse P2, respectively, so as to transmit the data signal Vdata into the pixel circuit 110-2 and read the sensing signal Sn-2 of the optical sensing circuit 120-2, and so on.

In practice, the aforesaid first transistor 112, second transistor 122, first switch SW1, and second switch SW2 may be realized with varies types of suitable N-type transistors.

In some embodiments, the first transistor 112, the second transistor 122, the first switch SW1, and the second switch SW2 are realized with P-type transistors. In this situation, the first control signal Ct1-1~CT1-$n$, the second control signal Ct2-1~Ct2-$n$, the third control signal Ct3, and the fourth control signal Ct4 have waveforms opposite to that of depicted in FIGS. 1 through 4, respectively.

Figure 7:
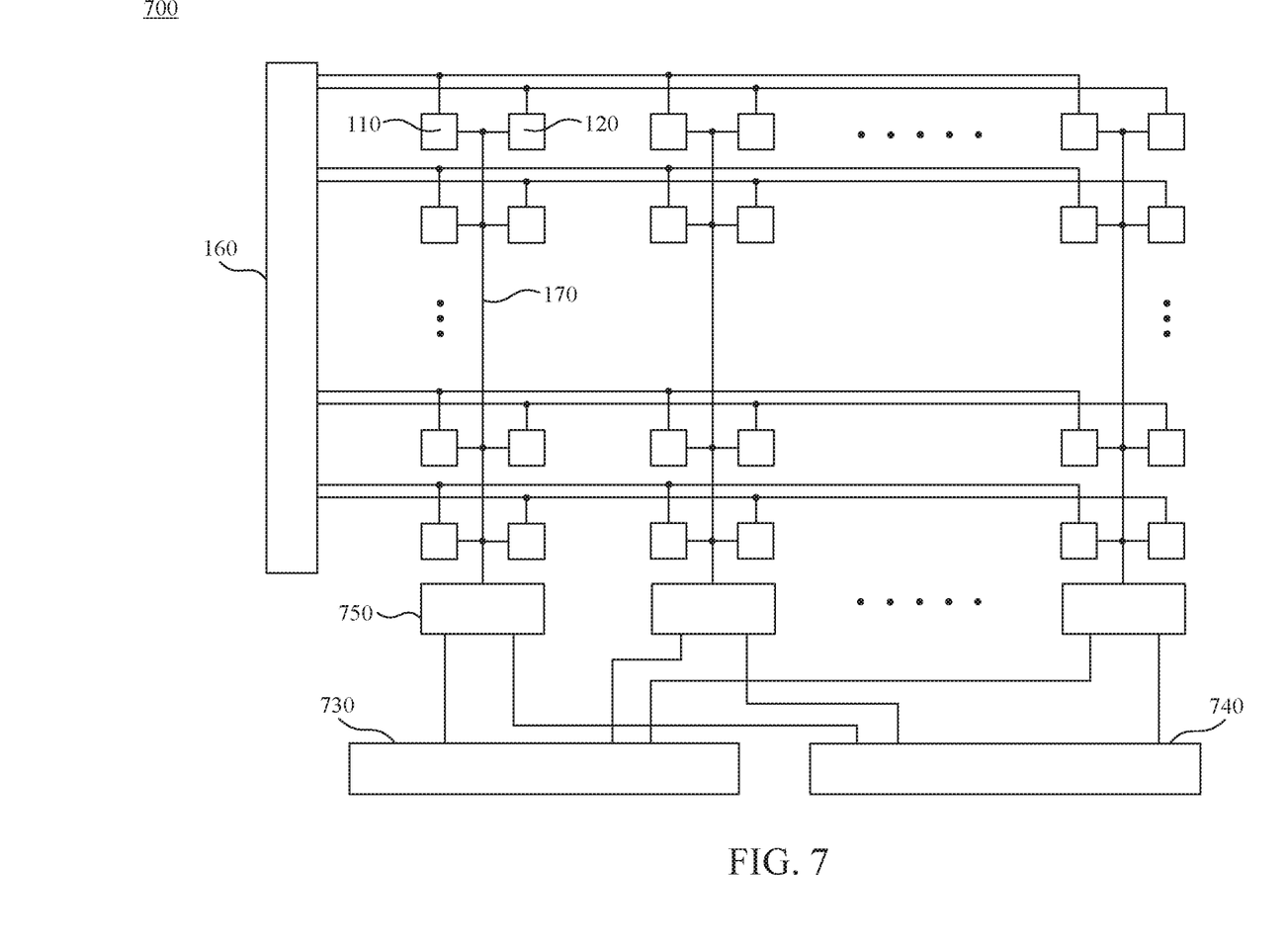
FIG. 7 is a simplified functional block diagram of a display device according to another embodiment of the present disclosure.

FIG. 7 is a simplified functional block diagram of a display device 700 according to another embodiment of the present disclosure. The components and the connection relationships among the components of the display device 700 is similar to the display device 100, the difference is that the source driving circuit 730 of the display device 700 is not coupled with the reading circuit 740. For the sake of brevity, other functional blocks of the display device 700 are not shown in FIG. 7.

Figure 8:
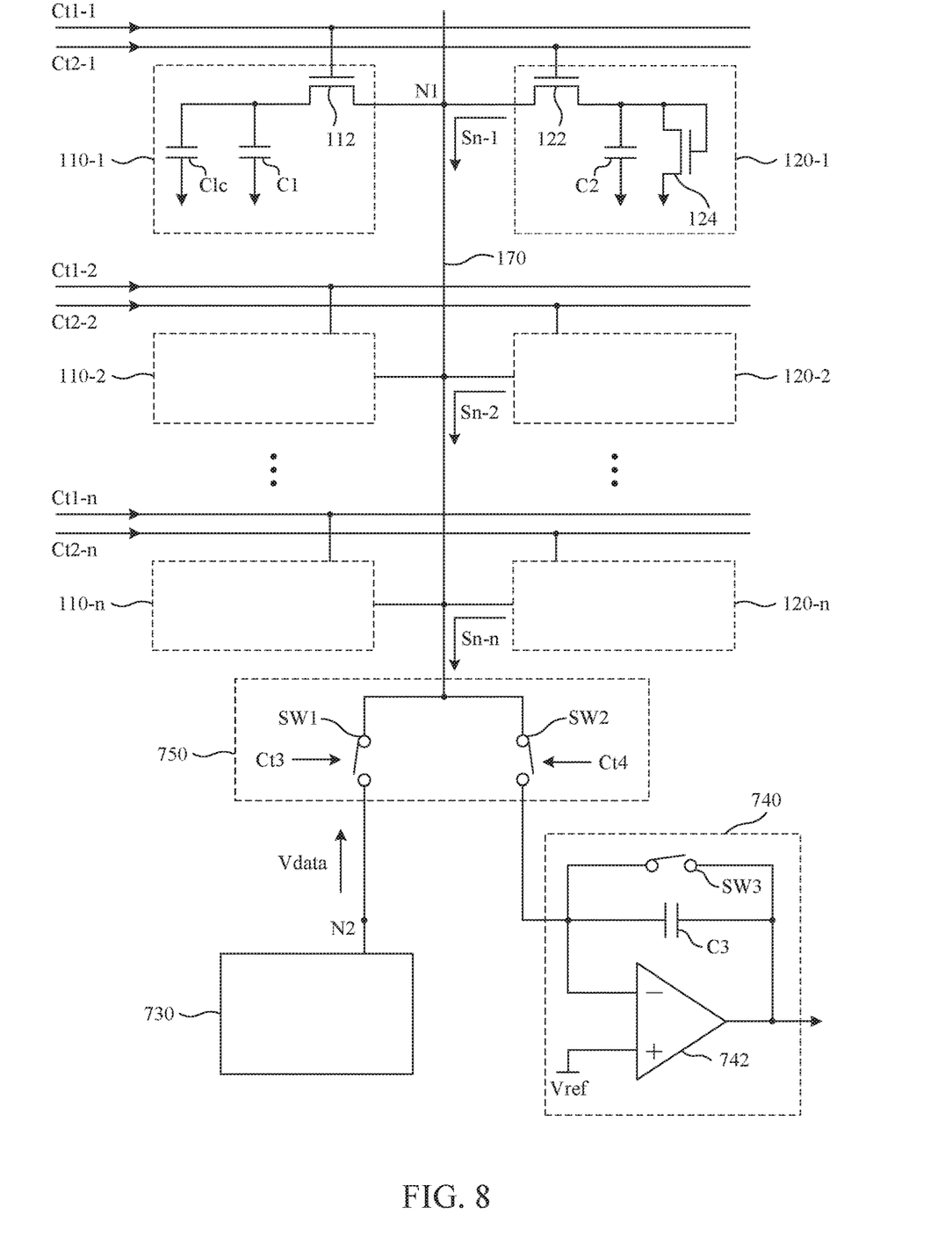
FIG. 8 is an enlarged schematic diagram of part of the display device of FIG. 7.

FIG. 8 is an enlarged schematic diagram of part of the display device 700 of FIG. 7. As shown in FIG. 8, the reading circuit 740 comprises a third switch SW3, a third capacitor C3, and an amplifier 742. The first node of the amplifier 742 (e.g., the inverting input node) is coupled with the second node of the second switch SW2. The second node of the amplifier 742 (e.g., the non-inverting input node) is configured to receive the reference voltage Vref from a voltage source difference from the source driving circuit 730, and the second node of the amplifier 742 is not coupled with the source driving circuit 730.

Figure 9:
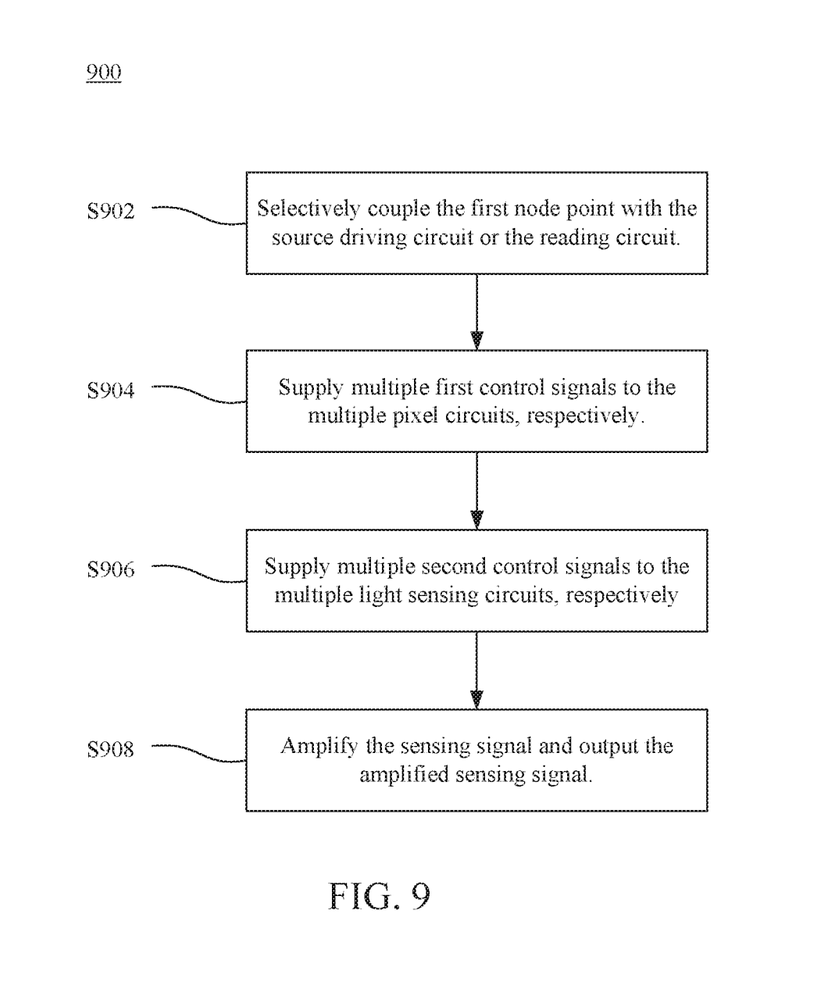
FIG. 9 is a display device driving method according to one embodiment of the present disclosure.
Figure 10:
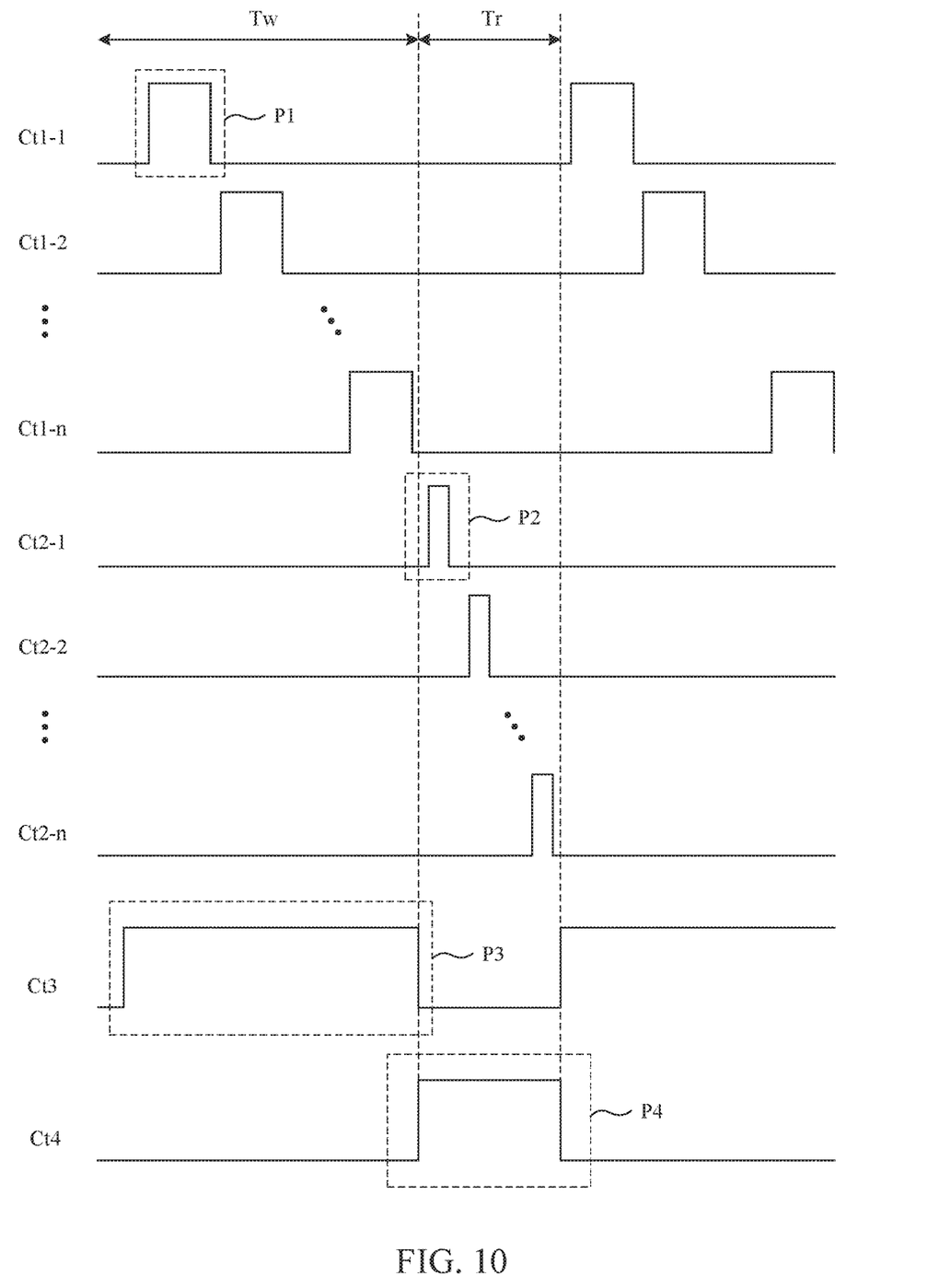
FIG. 10 is a timing diagram of control signals of the display device according to one embodiment of the present disclosure.

FIG. 9 is a display device driving method 900 according to one embodiment of the present disclosure. FIG. 10 is a timing diagram of control signals of the display device 700 according to one embodiment of the present disclosure. The display device driving method 900 is applicable to the display device 700, and will be further described in the following by reference to FIGS. 8 through 10.

In operation S902, the multiplexer 750 conducts one of the first switch SW1 and the second switch SW2 according to the third control signal Ct3 and the fourth control signal Ct4, and the status of the first switch SW1 is opposite to the status of the second switch SW2. That is, the third control signal Ct3 and the fourth control signal Ct4 is configured to control the switching operation of the multiplexer 750, so that the multiplexer 750 is capable of selectively coupling the first node point N1 with one of the source driving circuit 730 and the reading circuit 740. The detail operation of the multiplexer 750 will be further described in the following paragraphs.

In the operation S904, the display device 700 enters a writing stage Tw. In the writing stage Tw, the first switch SW1 is conducted and the second switch SW2 is switched off. The display device 700 supplies multiple first control signals Ct1-1~Ct1-$n$ to the multiple pixel circuits 110-1~110-$n$, respectively, so that the pixel circuits 110-1~110-$n$ receive the data signal Vdata from the first node point N1.

As shown in FIG. 10, in the writing stage Tw, the first control signals Ct1-1~Ct1-$n$ sequentially provide the first impulse P1. For example, the first control signal Ct1-1 first provides the first impulse P1, when the first impulse P1 of the first control signal Ct1-1 ends, the first control signal Ct1-2 provides the first impulse P1 thereof, and so on. As a result, the first transistors 112 of the pixel circuits 110-1~110-$n$ are conducted sequentially, and thus the data signal Vdata is sequentially transmitted to the liquid crystal capacitors Clc of the pixel circuits 110-1~110-$n$.

Then, in operation S906, the display device 700 enters the reading stage Tr. In the reading stage Tr, the first switch SW1 is switched off and the second switch SW2 is conducted. The display device 700 supplies multiple second control signals Ct2-1~Ct2-$n$ to the multiple optical sensing circuits 120-1~120-$n$, respectively.

In the reading stage Tr, the second control signals Ct2-1~Ct2-$n$ sequentially provide the second impulse P2. For example, the second control signal Ct2-1 first provides the second impulse P2, when the second impulse P2 of the second control signal Ct2-1 ends, the second control signal Ct2-2 provides the second impulse P2 thereof, and so on. Therefore, the second transistors 122 of the optical sensing circuits 120-1~120-$n$ are conducted sequentially, and thus the optical sensing circuits 120-1~120-$n$ output the sensing signals Sn-1-Sn-n sequentially.

Notably, the writing stage Tw and the reading stage Tr are next to each other, and the duration of the writing stage Tw is forbidden to overlap with the duration of the reading stage Tr. Therefore, in this embodiment, the duration of the multiple first impulses P1 is forbidden to overlap with the duration of the multiple second impulses P2.

In operation S908, the display device 700 is in the reading stage Tr. In this situation, when the reading circuit 140 receives the sensing signals Sn-1~Sn-n, the reading circuit 140 amplifies the sensing signals Sn-1~Sn-n and outputs the amplified sensing signals Sn-1~Sn-n.

Figure 11:
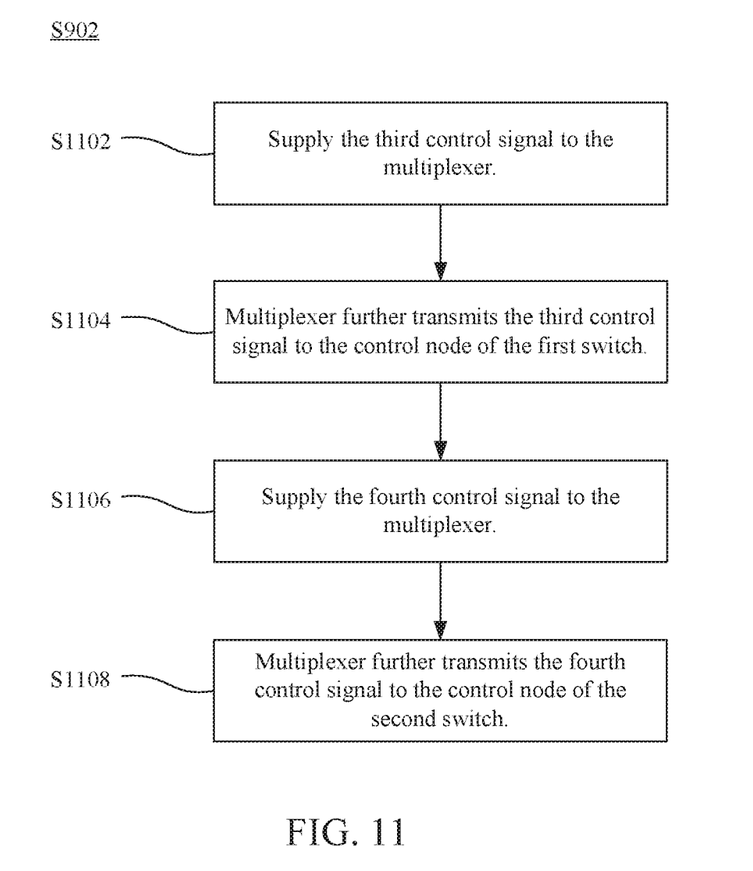
FIG. 11 is a flowchart for further illustrating the operation S902 according to one embodiment of the present disclosure.

FIG. 11 is a flowchart for further illustrating the operation S902 according to one embodiment of the present disclosure. As shown in FIG. 11, the operation S902 comprises operations S1102~S1108. In operation S1102, the display device 700 supplies the third control signal Ct3 to the multiplexer 750. Then, in operation S1104, the multiplexer 750 further transmits the third control signal Ct3 to the control node of the first switch SW1. In the writing stage Tw, the third control signal Ct3 provides one third impulse P3, so as to maintain the first switch SW1 being conducted during the writing stage Tw. Therefore, the duration of the third impulse P3 overlaps with the duration of the multiple first impulses P1 of the first control signals Ct1-1~Ct1-$n$.

In operation S1106, the display device 700 supplies the fourth control signal Ct4 to the multiplexer 750. Then, in operation S1108, the multiplexer 750 further transmits the fourth control signal Ct4 to the control node of the second switch SW2. In the reading stage Tr, the fourth control signal Ct4 provides a fourth impulse P4, so as to maintain the second switch SW2 being conducted during the reading stage Tr. Therefore, the duration of the fourth impulse P4 overlaps with the duration of the multiple second impulses P2 of the second control signals Ct2-1~Ct2-$n$.

In this embodiment, the third control signal Ct3 is opposite to the fourth control signal Ct4. Therefore, the duration of the third impulse P3 is forbidden to overlap with the duration of the multiple second impulses P2 of the second control signals Ct2-1~Ct2-n, and the duration of the fourth impulse P4 is forbidden to overlap with the duration of the multiple first impulses P1 of the first control signals Ct1-1~Ct1-n.

Notably, the execution sequences of the flowcharts depicted in FIGS. 3, 5, 6, 9, and 11 are merely exemplary embodiments, and are not intend to restrict the practical implementations of this disclosure. For example, the execution sequences of the operations S304 and S306 of FIG. 3 may be swapped with each other, or the operations S304 and S306 may be conducted in parallel. The operation S302 may be conducted in parallel with the operations S304~S308. The operations S502 and S504 may be conducted in parallel with the operations S506 and S508. The execution sequences of the operations S602 and S604 of FIG. 6 may be swapped with each other, or the operations S602 and S604 may be conducted in parallel.

As another example, the execution sequences of the operations S904 and S906 of FIG. 9 may be swapped with each other, or the operations S304 and S306 may be conducted in parallel. The operation S902 may be conducted in parallel with the operations S904~S908. The operations S1102 and S1104 may be conducted in parallel with the operations S1106 and S1108.

As can be appreciated from the foregoing descriptions, when the display devices 100 and 700 execute the display device driving methods 300 and 900, respectively, the writing operation corresponding to the data signal Vdata and the reading operation corresponding to the sensing signals Sn-1~Sn-n will not be conducted in parallel. Therefore, the interference between the data signal Vdata and the sensing signals Sn-1~Sn-n is obviated.

Furthermore, since the data signal Vdata and the sensing signals Sn-1~Sn-n are transmitted through the same signal path (i.e., the data line 170), the display devices 100 and 700 have simple circuit structures.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

In addition, the singular forms "a," "an," and "the" herein are intended to comprise the plural forms as well, unless the context clearly indicates otherwise.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A display device driving method, applicable to a display device comprising a pixel circuit, a source driving circuit configured to provide a data signal, and a reading circuit, comprising:
   supplying a first control signal to the pixel circuit, wherein the first control signal provides a first impulse configured to enable the pixel circuit to receive the data signal from a first node point;
   supplying a second control signal to an optical sensing circuit, wherein the second control signal provides a second impulse configured to enable the optical sensing circuit to output a sensing signal to the reading circuit through the first node point;
   supplying a third control signal to a multiplexer, wherein the multiplexer is coupled with the first node point, the source driving circuit, and the reading circuit:
   supplying a fourth control signal opposite to the third control signal to the multiplexer, wherein the third control signal and the fourth control signal are configured to control a switching operation of the multiplexer so that the first node point is selectively coupled with the source driving circuit or the reading circuit; and
   utilizing the reading circuit to amplify the sensing signal and output the amplified sensing signal,
   wherein duration of the second impulse overlaps with duration of the first impulse,
   wherein the third control signal provides a plurality of third impulses, the duration of the first impulse at least partially overlaps with duration of two adjacent third impulses of the plurality of third impulses, and the duration of the second impulse is forbidden to overlap with the duration of the two adjacent third impulses.

2. The display device driving method of claim 1, wherein the multiplexer comprises a first switch and a second switch, the first switch is coupled between the first node point and the source driving circuit, the second switch is coupled between the first node point and the reading circuit, and the operation of selectively coupling the first node point with the source driving circuit or the reading circuit further comprises:
   supplying the third control signal to a control node of the first switch; and
   supplying the fourth control signal to a control node of the second switch.

3. The display device driving method of claim 1, wherein the reading circuit comprises an amplifier, the amplifier comprises a first node, a second node, and an output node, and the operation of utilizing the reading circuit to amplify the sensing signal and output the amplified sensing signal comprises:
   utilizing the first node of the amplifier to receive the sensing signal;
   utilizing the source driving circuit to supply a reference voltage to the second node of the amplifier; and
   utilizing the output node of the amplifier to output the amplified sensing signal according to the sensing signal and the reference voltage.

4. The display device driving method of claim 1, wherein the display device further comprises a data line, and the first node point is located on the data line,
   wherein the data line has a charging time constant, and the duration of the first impulse is at least three times as long as the charging time constant.

5. The display device driving method of claim 4, wherein the charging time constant represents a time period required to charge a voltage level of the data line from 0 V to 63.2% of a voltage level of the data signal when utilizing the data signal to charge the data line.

6. A display device, comprising:
a plurality of pixel circuits, wherein a pixel circuit of the plurality of pixel circuits is coupled with a first node point;
a plurality of optical sensing circuits, wherein an optical sensing circuit of the plurality of optical sensing circuits is coupled with the first node point;
a source driving circuit, configured to provide a data signal;
a reading circuit, coupled with the source driving circuit;
a gate driving circuit, configured to supply a first control signal and a second control signal, wherein the first control signal provides a first impulse configured to enable the pixel circuit to receive the data signal from the first node point, and the second control signal provides a second impulse configured to enable the optical sensing circuit to output a sensing signal to the reading circuit through the first node point; and
a plurality of multiplexers, wherein a multiplexer of the plurality of multiplexers is coupled with the first node point, the source driving circuit, and the reading circuit, the multiplexer is supplied with a third control signal and a fourth control signal opposite to the third control signal, and the third control signal and the fourth control signal are configured to control a switching operation of the multiplexer so that the first node point is selectively coupled with the source driving circuit or the reading circuit,
wherein the reading circuit is configured to amplify the sensing signal and output the amplified sensing signal, and duration of the second impulse overlaps with duration of the first impulse,
wherein the third control signal provides a plurality of third impulses, the duration of the first impulse at least partially overlaps with duration of two adjacent third impulses of the plurality of third impulses, and the duration of the second impulse is forbidden to overlap with the duration of the two adjacent third impulses.

7. The display device of claim 6, wherein the pixel circuit comprises a first capacitor, a liquid crystal capacitor, and a first transistor, the first transistor is coupled between the first node point and the first capacitor as well as the liquid crystal capacitor, and the optical sensing circuit comprises:
a second capacitor;
a second transistor, comprising a first node, a second node, and a control node, wherein the first node of the second transistor is coupled with the first node point, the second node of the second transistor is coupled with the second capacitor, and the control node of the second transistor is configured to receive the second control signal; and
a third transistor, comprising a first node, a second node, and a control node, wherein the first node and the control node of the third transistor is coupled with the second node of the second transistor and the second capacitor, and the second node of the third transistor is configured to receive a fixed voltage.

8. The display device of claim 7, wherein the first transistor comprises a first node, a second node, and a control node, the first node of the first transistor is coupled with the first node point, the second node of the first transistor is coupled with the first capacitor and the liquid crystal capacitor, and the control node of the first transistor is configured to receive the first control signal,
wherein the first node point is located on a data line, the data line is coupled with a column of pixels of the plurality of pixels, and coupled with a column of optical sensing circuits of the plurality of optical sensing circuits.

9. The display device of claim 6, wherein the multiplexer comprises:
a first switch, comprising a first node, a second node, and a control node, the first node of the first switch is coupled with the first node point, the second node of the first switch is coupled with the source driving circuit through a second node point, and the control node of the first switch is configured to receive the third control signal; and
a second switch, comprising a first node, a second node, and a control node, wherein the first node of the second switch is coupled with the first node point, the second node of the second switch is coupled with the reading circuit, and the control node of the second switch is configured to receive the fourth control signal.

10. The display device of claim 9, wherein the reading circuit comprises:
an amplifier, comprising a first node, a second node, and an output node, wherein the first node of the amplifier is coupled with the second node of the second switch, and the second node of the amplifier is coupled with the second node point;
a third capacitor; and
a third switch, wherein the third capacitor and the third switch are coupled between the first node and the output node of the amplifier in a parallel connection.

* * * * *